United States Patent [19]
Tipton et al.

[11] Patent Number: 5,143,318
[45] Date of Patent: Sep. 1, 1992

[54] SPOOL OSCILLATION STRUCTURE FOR FISHING REEL

[75] Inventors: Steven M. Tipton, Tulsa; Dennis E. Roberts, Owasso, both of Okla.

[73] Assignee: Zebco Corporation, Tulsa, Okla.

[21] Appl. No.: 539,805

[22] Filed: Jun. 18, 1990

[51] Int. Cl.⁵ .............................................. A01K 89/01
[52] U.S. Cl. .................................................... 242/241
[58] Field of Search ............................... 242/241, 242

[56] References Cited

U.S. PATENT DOCUMENTS

| | | |
|---|---|---|
| 2,613,468 | 10/1952 | Hand . |
| 3,224,703 | 12/1965 | Clark .................. 242/282 X |
| 3,946,963 | 3/1976 | Oberg .................. 242/246 |
| 4,114,825 | 9/1978 | Murvall ................. 242/242 |
| 4,196,869 | 4/1980 | Shepherd ........... 242/242 X |
| 4,784,347 | 11/1988 | Kobayashi et al. ......... 242/242 |

FOREIGN PATENT DOCUMENTS

| | | | |
|---|---|---|---|
| 268817 | 3/1964 | Australia ............................. 242/242 |
| 0411294 | 3/1947 | Italy .................................... 242/242 |
| 694177 | 9/1965 | Italy .................................... 242/242 |
| 0623496 | 5/1947 | United Kingdom ................ 242/241 |

OTHER PUBLICATIONS

Converting Mechanisms, Mar. 2, 1959, pp. 64–65.

*Primary Examiner*—Katherine Matecki
*Attorney, Agent, or Firm*—Wood, Phillips, VanSanten, Hoffman & Ertel

[57] ABSTRACT

A reciprocating/oscillating structure for a reel of the type having a housing, a line carrying spool, a rotor mounted for rotation relative to the housing for directing line onto the spool, a rotatable crank handle for operating the rotor, and structure for reciprocating/oscillating the spool along a line with respect to the housing as the crank handle and rotor are operated to thereby direct line onto the spool. The center shaft is movable cyclically—in one of the fore and aft directions through a first part of the cycle and in the other of the fore and aft directions through a second part of the cycle. The reciprocating/oscillating structure causes the center shaft to move at a first velocity through the first cycle part and at a second velocity through the second cycle part for a given rotational velocity of the crank handle, with the first and second velocities being different.

11 Claims, 2 Drawing Sheets

SPOOL OSCILLATION STRUCTURE FOR FISHING REEL

BACKGROUND OF THE INVENTION

1. Field of the Invention

This invention relates to fishing reels and, more particularly, to a reel of the type having a reciprocating/oscillating spool which causes even disposition of line around the spool during retrieval.

2. Background Art

It is conventional to construct spinning reels with a rotor that is operable to wind line around a spool and to concurrently reciprocate/oscillate the spool so that line is drawn evenly over the axial extent of the rotor during retrieval.

One objective of spinning reel designers is to maximize casting distance. It has been found that casting distance is increased by lengthening the stroke of the reciprocating/oscillating spool. Heretofore, this stroke lengthening structure has been fairly expensive and generally an option only on top of the line fishing reels. This high cost is generally attributable, at least in part, to the delicate and time consuming assembly steps required to produce reels with such structures incorporated. Further, the structure to lengthen the stroke has generally accounted for an undesirable increase in the overall size of the reel.

Examples of known, prior art fishing reels, in which the above problems exist, are as follows: U.S. Pat. Nos. 2,613,468 (Hand); 3,224,703 (Clark); 3,946,963 (Oberg); 4,114,825 (Murvall); 4,196,869 (Shepherd); and 4,784,347 (Kobayashi et al).

Another problem with conventional spinning style reels is that the line tends to bury itself as it is retrieved, which causes binding as the line is paid out, as during a cast. This burying results from the fact that the spool shifts axially slowly and at a constant speed with respect to the rotor in both directions of travel so that the rise angle for the spiral of line is relatively small. In other words, the coils of line tend to wrap closely next to each other as the spool moves in each direction. The result of this is that the overlying turns align with and tend to be guided into the gap between adjacent underlying turns, causing the line to "bury" itself.

A still further problem with prior art spinning reels is that there tends to be a significant amount of force exerted by the reciprocating/oscillating structure other than in an axial direction on the center shaft. These non-aligned forces must be overcome by the operator and this requires additional torque to be applied by the operator on the crank handle.

SUMMARY OF THE INVENTION

The present invention is directed to overcoming the above enumerated problems in a novel and simple manner.

The present invention is directed to a reciprocating/oscillating structure for a reel of the type having a housing, a line carrying spool, a rotor mounted for rotation relative to the housing for directing line onto the spool, a rotatable crank handle for operating the rotor, and structure for reciprocating/oscillating the spool along a line with respect to the housing as the crank handle and rotor are operated to thereby direct line onto the spool.

According to the invention, the center shaft is movable cylindrically—in one of the fore and aft directions through a first part of the cycle and in the other of the fore and aft directions through a second part of the cycle. The reciprocating/oscillating structure causes the center shaft to move at a first velocity through the first cycle part and at a second velocity through the second cycle part for a given rotational velocity of the crank handle, with the first and second velocities being different.

With the inventive structure, the turns of line are wound around the spool in a different pattern for the opposite directions of travel therefor. That is, as the rotor moves in the slower cycle part, the turns of line are closer together and more numerous than those formed as the rotor moves oppositely and more rapidly. The more loosely wound turns cross the underlying turns at a relatively large angle and thereby tend to bridge the gap between underlying turns wrapped onto the spool during the slower of the first and second cycle parts to thereby prevent the line from burying between adjacent, underlying coils, particularly when the line is retrieved under load. In short, the turns of adjacent layers cross each other at fairly large angles to prevent line burying.

The invention also contemplates a simple, relatively inexpensive, compact mechanism for extending the stroke of the center shaft during reciprocation/oscillation.

More particularly, the reciprocating/oscillating structure consists of an oscillating pivot arm having spaced first and second ends, structure for connecting the oscillating arm within the housing for pivoting movement about a first axis, a first pin and slot connection between the center shaft and the second end of the oscillating arm for causing the center shaft to move in fore and aft directions in response to rotation of the first end of the oscillating arm in opposite directions about the first axis, and structure for effecting pivoting of the first end of the oscillating arm about the first axis in response to rotation of the crank handle.

In a preferred form, the structure for effecting pivoting of the first end of the oscillating arm consists of an oscillating drive gear with a second pin and slot connection between the oscillating drive gear and the oscillating arm, and structure for rotating the oscillating drive gear as an incident of the crank handle being operated.

The invention contemplates that the slots associated with the first and second pin and slot arrangements be either curved or straight. A curved slot for the first pin and slot connection permits the forces that are exerted on the center shaft to be principally in the axial direction. A straight slot is, however, also within the scope of the invention.

The slot associated with the second pin and slot arrangement, when straight, allows the first and second cycle parts to be varied relative to each other to thereby control the relative velocities of the spool in fore and aft directions. Typically, the oscillating drive gear has a pin which moves in the slot associated with the second pin and slot connection. With a straight slot, the reciprocating/oscillating structure can be used to move the center shaft through its full rearward stroke by rotation of the oscillating drive gear through less than 180°—for example on the order of 160°. The other part of the cycle, which produces the opposite center shaft stroke, occurs through 180 plus the additional 20° rotation of the oscillating drive gear. With a constant rotation of the crank handle, the center shaft movement in one direction is quicker than in the other direction, with the above attendant advantages. A curved slot could be employed to equalize the velocity of the opposite strokes.

The invention contemplates that the center shaft stroke be longer than two times the radial distance between the rotational axis of the oscillating drive gear and the pin associated with the second pin and slot connection, the latter distance being typical of many conventional type reels. To accomplish this end, the second pin and slot arrangement acts on the oscillating pivot arm intermediate the length thereof, so that the free end of the pivot arm engages the center shaft and causes an extended stroke.

Another aspect of the invention is the facilitated assembly of the center shaft to the oscillating pivot arm. In one form of the invention, the oscillating pivot arm has a bifurcated end which defines a recess/slot for reception of an extension on the center shaft. One form of the extension is a disc-shaped paddle which fits within the pivot arm recess/slot and is slidable in a vertical direction relative thereto in operation. A pin extends preferably through both legs defined by the bifurcation on the oscillating pivot arm, through the disc shaped extension, and is guided by a slot in one or both of the pivot arm legs.

An alternative form of the extension has a generally I-shape with a vertical body and transverse cross bars. The body of the I slides within the recess/slot during operation. With this arrangement, the oscillating arm and extension are operatively engaged by placing the legs of the bifurcated oscillating arm surroundingly over the body of the I-shaped extension whereafter a pin or the like is then attached to pivotably connect the end of the oscillating pivot arm remote from the bifurcated end. The extension itself need not be connected to the center shaft as by pins or other types of fasteners.

In one form of the invention, one of the slots is a blind slot in one leg of the oscillating arm and the other slot is provided in the other leg of the oscillating arm.

DETAILED DESCRIPTION OF THE DRAWINGS

Figure 1:
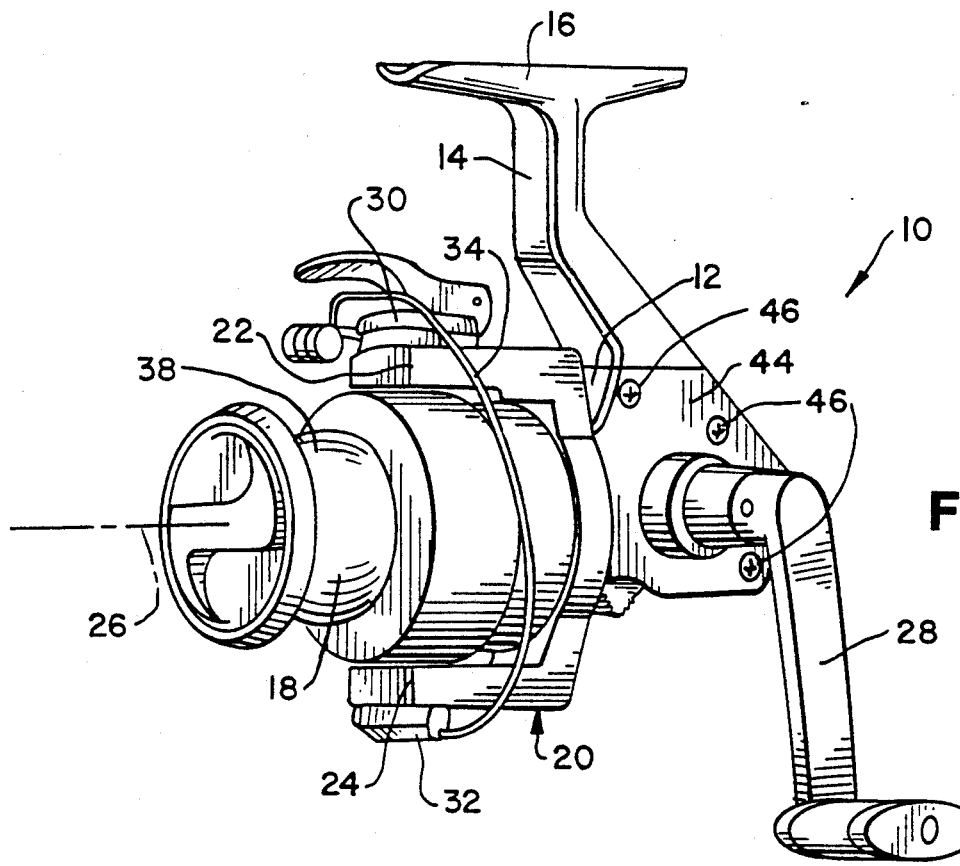
FIG. 1 is a perspective view of a spinning style fishing reel with spool oscillating/reciprocating structure, according to the present invention, incorporated therein and with a spool thereon in a fully forward position.
Figure 2:
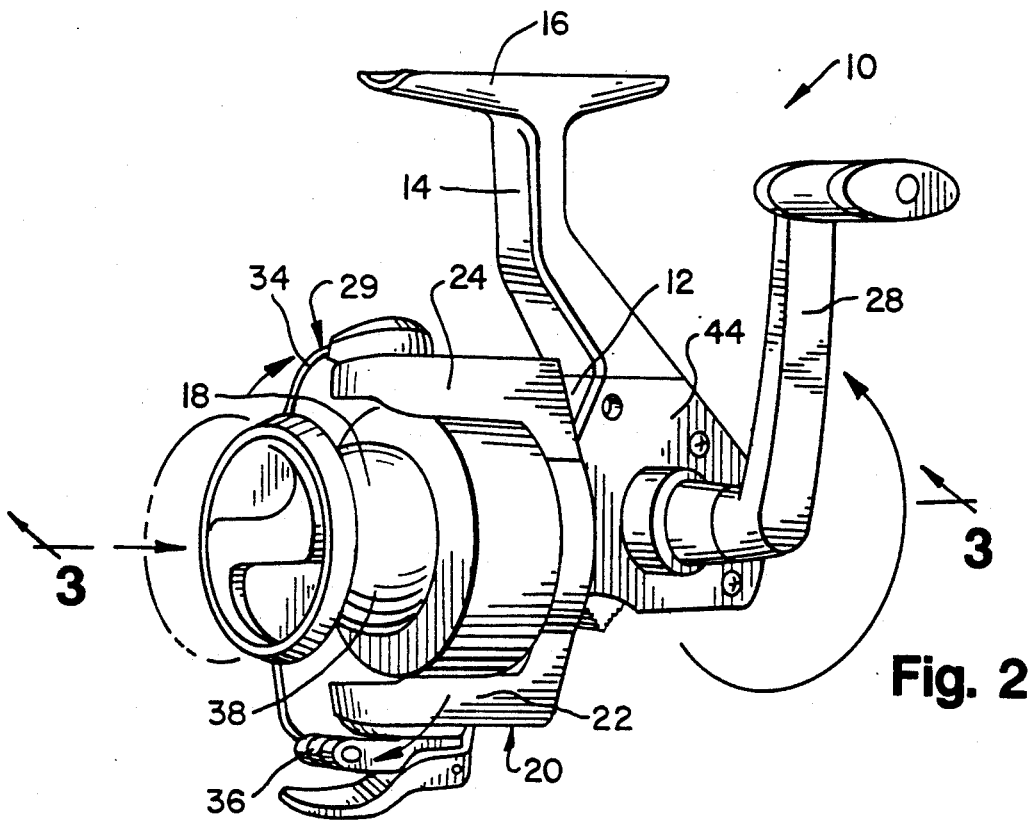
FIG. 2 is a view as in FIG. 1 with the spool thereon in its rearwardmost position.

In FIGS. 1 and 2, a spinning style fishing reel is shown at 10, which reel 10 is of the type suitable for incorporation of the present invention. The reel 10 consists of a fixed housing 12 with an integral mounting stem 14 with a foot 16 thereon for attachment to a fishing rod (not shown).

A spool 18 is provided at the front of the reel 10 and holds a supply of fishing line. To effect wrapping of the line around the spool 18, a rotor 20 is provided. The rotor 20 has diametrically opposed bail ears 22, 24 which rotate about a lengthwise, fore and aft axis 26 for the reel 10. This rotation is imparted through an external crank handle 28 through an internal mechanism as will be described in detail below.

The bail ears 22, 24 cooperatively define a support for a pivotable bail assembly 29 consisting of spaced bail arms 30, 32 and a formed wire bail 34 connecting therebetween. As the rotor 20 is operated, a line guide 36 on the bail assembly 29 engages the line and wraps the line around the hub 38 of the spool 18. Because the line guide 36 has a fixed axial position with respect to the reel as it is operating, it is necessary to reciprocate/oscillate the spool 18 about the fore and aft reel axis 26 to cause an even distribution of line on the spool 18 during retrieval. This reciprocation/oscillation occurs cyclically with a spool stroke between the solid line position of FIG. 1, representing the forwardmost spool position, and the FIG. 2 position for the spool, representing the rearwardmost spool position. The relative positions of the spool 18 in the forwardmost and rearwardmost positions therefor can be seen in phantom and solid lines, respectively, in FIG. 2.

The present invention is directed to the structure for reciprocating/oscillating the spool 18, with the details of that structure shown in FIGS. 3–7. The reel housing 12 has an opening at 40 which permits access to the internal reciprocating/oscillating structure at 42. With the reel assembled, a cover plate 44 (FIGS. 1 and 2) seals the opening 40. The cover plate 44 is removably held in place by a plurality of screws 46 which, when removed, permit separation of the cover plate 44 from the reel housing 12 and access to the internal operating mechanism for the reel 10.

Figure 4:
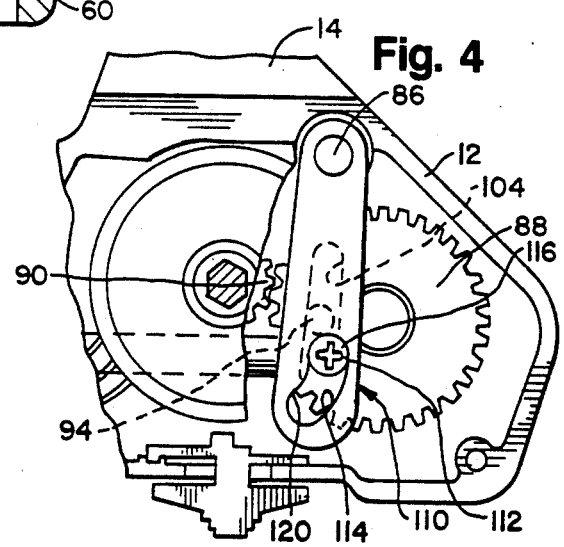
FIG. 4 is a fragmentary, sectional view as in FIG. 3 with the spool moved to its forwardmost position corresponding to that in FIG. 1.

The rotor 20, shown in FIG. 4 with the bail assembly 29 removed, is mounted for rotation on a pinion gear assembly at 48. The pinion gear assembly 48 consists of a tubular, hollow body 50 which is journalled for rotation within a forwardly extending sleeve 52 on the housing 12, as by a bearing 54. A pinion gear 56 surrounds the tubular body 50 and is fixed for rotation therewith. The forward free end 58 of the body 50 extends through a hub 60 on the rotor 20 and is threadably connected thereto.

Figure 3:
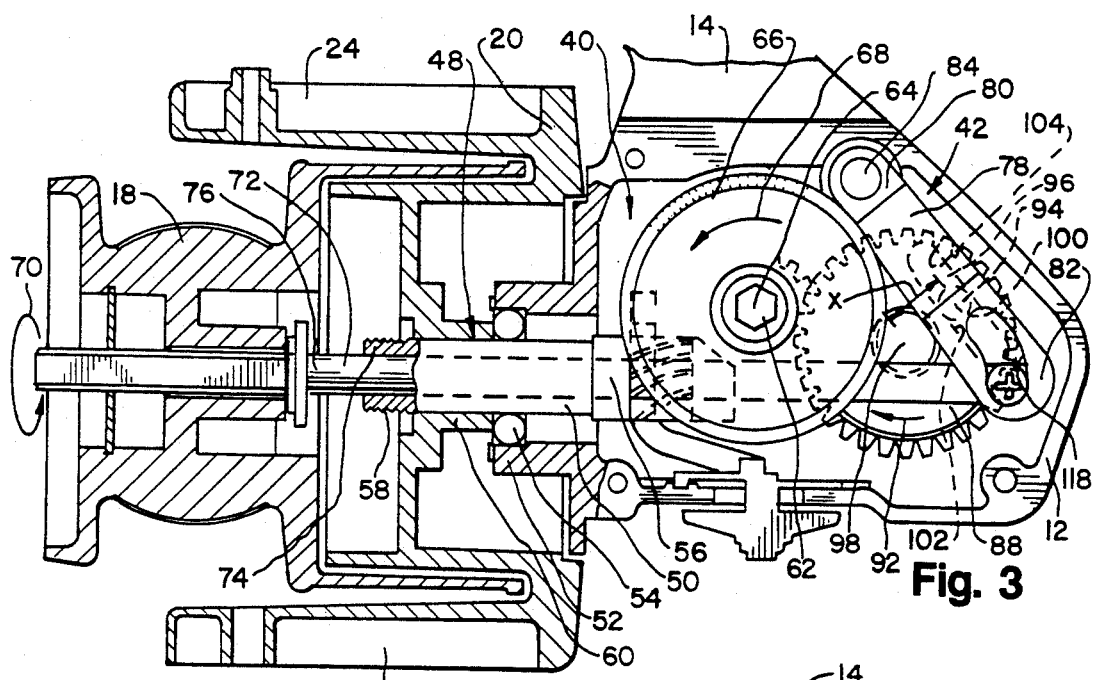
FIG. 3 is a cross-sectional view of the fishing reel of FIGS. 1 and 2, showing the spool oscillating/reciprocating structure according to the present invention, taken along line 3—3 of FIG. 2.

Rotation of the rotor 20 is effected by the crank handle 28 through a crank shaft 62 connected thereto. The crank shaft 62 is rotatable about a laterally extending axis 64 which is at right angles to the vertical plane through the fore and aft reel axis 26. The crank shaft 62 has a face gear 66 which meshes with the pinion gear 56 to transmit rotation from the crank handle 28 to the pinion gear 56 and, in turn, the rotor 20. As seen in FIG. 3, rotation of the crank shaft 62 in a counterclockwise direction, as indicated by arrow 68, effects rotation of the rotor in the direction indicated by the arrow 70.

At the same time that the rotor 20 is operated by the crank handle 28, the spool 18 is caused to reciprocate in the line of the fore and aft reel axis 26. This reciprocating/oscillating movement of the spool 18 is permitted by mounting the spool 18 on a reciprocating/oscillating center shaft 72. The center shaft 72 is coaxial with the tubular body 50 and is closely received within a bore 74 extending axially therethrough for guided movement in the fore and aft directions. The spool 18 is mounted on the forward part 76 of the center shaft 72 exposed forwardly of the pinion gear assembly 48.

Fore and aft axial shifting of the center shaft 72 is accomplished through the reciprocating/oscillating structure 42. The reciprocating/oscillating structure 42 for the spool 18/center shaft 72 consists of an elongate, oscillating pivot arm 78 having first and second opposite ends 80, 82 respectively. The first end 80 is pivotably attached to the housing, as by a pin 84, for rotation about an axis 86 that is substantially parallel to the rotational axis 64 of the crank shaft 62. Pivoting of the arm 78 about the axis 86 is effected through an oscillating drive gear 88 which is in mesh with a gear 90 on the crank shaft 62. Counterclockwise rotation of the face gear 66 in FIG. 3 effects clockwise rotation of drive gear 88, as indicated by arrow 92. The drive gear 88 has an integral, laterally projecting pin 94 which moves guidingly within a blind, elongate, straight slot 96 in the pivot arm 78 and opening laterally toward the drive gear 88.

The center shaft 72 operates cyclically and has a stroke length that is greater than the distance 2× in FIG. 3, where X is the distance between the rotational axis 98 for the drive gear 88 and the center 100 of the pin 94. In other words, the pin 94 traces a circle with a diameter equal to 2× in operation. It is known in the art to provide a pin and slot connection directly between a drive gear, corresponding to gear 88 in FIG. 3 and a center shaft. This limits the stroke to two times the distance between the axis of rotation of the drive gear in the center of the eccentric pin, which distance corresponds to 2× in FIG. 3. The inventive structure extends the stroke length over such conventional structures and, in addition, produces an arrangement wherein the center shaft 72 moves forwardly through one part of the cycle more rapidly than it retraces that path in an opposite, rearward direction.

To accomplish these ends, the slot 96 cooperating with the pin 94 is made straight and in substantial alignment with the length of the pivot arm 78. Referring to FIG. 3, as the drive gear 88 is rotated further in the clockwise position, the pin 94 engages the rearwardly facing surface 102 bounding the slot 96. The pin 94 causes forward movement of the center shaft 72 until the pin realizes approximately a nine o'clock position. At the nine o'clock position for the pin 94, which is shown in FIG. 4, further clockwise rotation of the gear 88 causes the pin 94 to engage the forwardly facing surface bounding the slot 96. Rotation through about 160°, to the two o'clock position shown in FIG. 3, then effects the full rearward movement of the center shaft 72.

Figure 8:
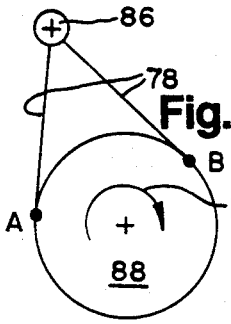
FIG. 8 is a schematic representation of the relationship between an oscillating pivot arm and oscillating drive gear associated with the spool reciprocating/oscillating structure according to the present invention throughout the operating range for the spool.

The significance of the above can be understood by reference to the schematic in FIG. 8. Assuming the crank shaft 62 is rotated at a constant velocity by the user, the drive gear 88 similarly rotates at a constant angular velocity in a clockwise direction as indicated by the arrow 106 in FIG. 8. Consequently, it takes less time for the pin 94 to travel from point A to point B, during rearward movement of the center shaft 72, than it does for the pin 94 to move from point B to point A, during forward movement of the center shaft 72. This difference in distance is attributable to the additional 20 or so degrees that the gear 88 must traverse to effect the same stroke movement for the center shaft 72.

The effect of this is that the line is not wrapped around the spool 18 in the same manner with the spool 18 moving in both fore and aft directions. As the center shaft 72 moves in a forward direction, its velocity, and thus that of the spool 18, is diminished compared to the velocity in the opposite direction for the same elements. The turns of line are thus more numerous per unit axial length. Upon the center shaft 72 moving rearwardly at the higher velocity, the line tends to be stretched angularly across and bridges the coils developed by the rotor 20 during forward movement thereof at a relatively large angle. This bridging tends to keep the line from migrating between adjacent turns. Similarly, when the center shaft 72 moves forwardly again, the turns developed during rearward movement of the spool 18 block passage of the turns between adjacent, subjacent turns. The turns of line do not intertangle and the user thus has the benefit of a longer stroke for the center shaft 72 and the substantially unimpeded payout of line.

Figure 5:
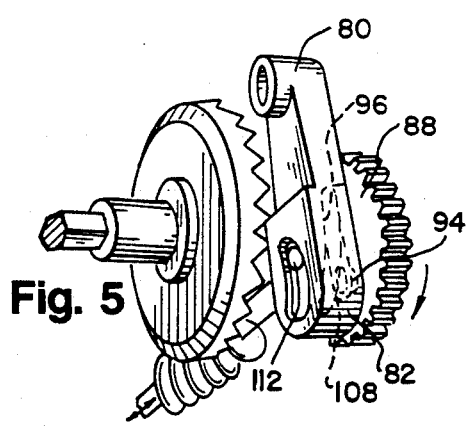
FIG. 5 is a perspective view of the spool reciprocating/oscillating structure according to the present invention.

It is possible to equalize the speed of the movement of the center shaft 72 in both the fore and aft directions by making the slot 96 curved, as shown in phantom in 108 in FIG. 5. With this arrangement, the curve in the slot 108 would begin at the two o'clock position so that the pin 94 would continue to urge the center shaft 72 rearwardly until the three o'clock position is realized. This would also cause the center shaft 72 to travel further rearwardly than with the FIG. 3 structure.

A pin and slot connection is also provided at 110 between the pivot arm 78 and the center shaft 72. The pin 112, in the embodiment shown, projects laterally into the curved slot 114. The pin 112, as shown in FIG. 4, may be a fastener with a head 116 thereon to facilitate threadable engagement with the center shaft 72. As can be seen in FIG. 3, as the pivot arm 78 moves from its rearwardmost position, a forwardly facing edge on the slot 114 bears the center shaft 72 in a forward direction. As this occurs, the pin 112 slides upwardly into the curved slot until the full forward position of FIG. 4 for the center shaft 72 is realized. With the reciprocating/oscillating mechanism 42 in the FIG. 4 position, further operation of the drive gear 88 causes the rearwardly facing, curved edge 120 bounding the slot 114 to bear the pin 112 in a rearward direction to thereby shift the center shaft 72 towards the FIG. 3 position therefor. In so doing, the pin 112 is guided progressively downwardly relative to the slot 114.

The curvature of the slot 114 is significant in that it at all times keeps the main force component on the pin 112 in axial alignment with the length of the center shaft 72. This minimizes the torque that must be exerted on the pivot arm 78 to effect movement of the center shaft 72 and thereby makes it easier for the user to operate the crank handle 28.

In FIGS. 3-5, one type of pivot arm 78 is shown together with one type of connection between the center shaft 72 and pivot arm 78. A modified form of pivot arm 122, according to the invention, is shown in FIGS. 6 and 7, together with two separate means for attaching the center shaft 72 to the pivot arm 122.

Figure 6:
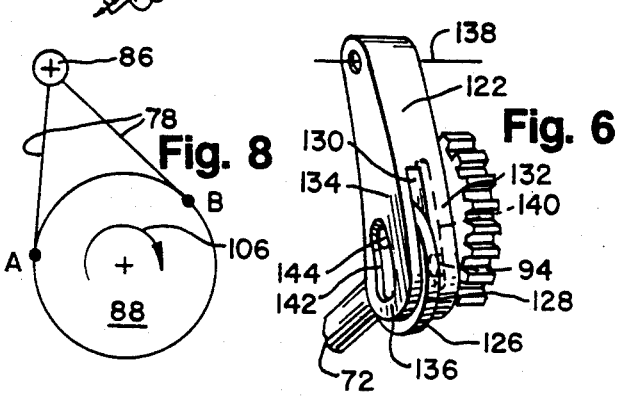
FIG. 6 is a perspective view of a modified form of spool reciprocating/oscillating structure according to the present invention.

In FIG. 6, an extension 126 is provided on the end of the center shaft 72. The extension 126 can be integrally formed with the center shaft 72 or may be separately attached thereto. The extension 126 has a disc-shaped body/paddle 128 which is received in a slot 130 defined between spaced legs 132, 134 on a bifurcated end 136 of the pivot arm 122, remote from the pivot axis 138, corresponding to the pivot axis 86 in the prior embodiment. The arm 122 otherwise operates in the same manner as the earlier described embodiment. The leg 132 has a slot 140 therethrough corresponding to the slot 96 in the prior embodiment and the leg 134 has a slot 142 corresponding to the slot 114 in the prior embodiment. A pin 144 extends through the disc-shaped body 128 on the extension 126 and cooperates with the slot 142, with the pin 94 cooperating with the slot 140 to produce substantially the same movement of the center shaft 72 as in the prior embodiment.

Figure 7:
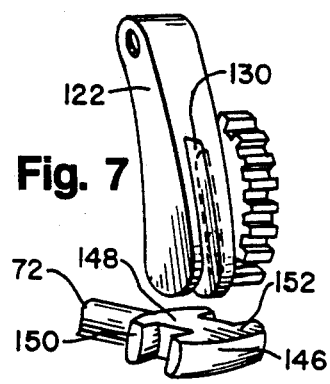
FIG. 7 is a perspective view of a still further modified form of spool reciprocating/oscillating structure according to the present invention.

A modified extension 146 is shown in FIG. 7. The extension 146 eliminates the need for separate assembly of a pin 144 as in the FIG. 6 embodiment. The extension 146 has an I-shape with a vertical body 148 and spaced cross bars 150, 152. The body 148 is simply directed up into the slot 130 during assembly. The arm 122 bears on the cross bar 150 as it moves in a clockwise direction and against the cross bar 152 as it moves in a counterclockwise direction. Facilitated connection of the pivot arm 122 and center shaft 72 results.

The foregoing disclosure of specific embodiments is intended to be illustrative of the broad concepts comprehended by the invention.

We claim:

1. In a fishing reel of the type having a housing, a line carrying spool, a rotor mounted for rotation relative to the housing for directing line onto the spool, a rotatable crank handle for operating said rotor, and means for reciprocating/oscillating the spool along a line with respect to the housing as the crank handle and rotor are operated to direct line onto the spool, said reciprocating/oscillating means including a center shaft movable in a fore direction and an aft direction with respect to the housing for effecting reciprocating/oscillating movement of the spool, said reciprocating/oscillating means comprising:

said center shaft being movable through a cycle (a) in one of said fore and aft directions through a first part of said cycle and (b) in the other of said fore and aft directions through a second part of said cycle; and said reciprocating/oscillating means including means for moving the center shaft at a first velocity through said first cycle part and at a second velocity through said second cycle part for a given rotational velocity of said crank handle, said first and second velocities being different, said reciprocating/oscillating means comprising an oscillating pivot arm having spaced first and second ends, first means for pivotably connecting the first end of the oscillating pivot arm to the housing for pivoting movement relative thereto about a first axis, second means for connecting the center shaft to the second end of the oscillating pivot arm and for causing the center shaft to move in said fore and aft directions in response to pivoting of the first end of the oscillating pivot arm in opposite directions about said first axis, and means for effecting said pivoting of the first end of the oscillating pivot arm about the first axis in response to rotation of the crank handle, said means for effecting pivoting of the first end of the first oscillating pivot arm comprising a drive gear that is rotatably mounted about a fixed axis substantially parallel to the first axis, a first pin on the drive gear and a first slot in the oscillating pivot arm for reception of the first pin on the drive gear, said first pin moving reciprocatively in the first slot as the pivot arm oscillates, said reel including means for rotating the drive gear in response to rotation of the crank handle, wherein said oscillating pivot arm is bifurcated to define first and second laterally overlapping legs defining a second slot therebetween and the center shaft has an extension which resides at least partially in the second slot between the first and second legs.

2. The fishing reel according to claim 1 wherein said extension has a disc-shaped end which resides between the first and second legs and a second pin extends through at least one of the first and second legs and into the disc-shaped end.

3. The fishing reel according to claim 1 wherein said extension has an I-shaped end with a body and spaced cross-bars and the body of the I-shaped end comprises a second pin which resides in the slot defined between the first and second legs on the oscillating pivot arm.

4. The fishing reel according to claim 3 wherein the body of the I-shaped end extends substantially parallel to the axis of the center shaft.

5. In a spinning reel having a housing being open on one side and having a forwardly extending sleeve on the front thereof with an opening through the sleeve, a cover plate for covering said open side of the housing, a pinion assembly extending rotatably through said sleeve and having a rotor secured to an exposed end of said pinion assembly, a pinion gear on the portion of said pinion assembly inside said housing, a crank shaft in the housing having a crank handle exterior of the housing, the crank shaft lying transverse to the axis of the pinion assembly, a drive gear on said crank shaft meshing with the pinion gear on the pinion assembly, a second gear on said crank shaft, an oscillating drive gear meshing with the second gear on the crank shaft, a rotor having a bail assembly for directing line onto the reel as the rotor is operated, a center shaft extending through said pinion assembly and supporting a spool on a forward end thereof and means for oscillating said center shaft, characterized by an oscillating pivot arm pivotably mounted on the housing above the center shaft, said pivot arm having a first elongate blind slot on one side thereof;

a pin on one side face of the oscillating drive gear engaging in said first elongate slot in said pivot arm;

a curved slot formed in the other side of said pivot arm; and a slot in the midportion of the pivot arm between the first elongate blind slot and the curved slot, said slot communicating with the curved slot throughout substantially the entire extent of said curve slot, a rear end portion of the center shaft extending into said slot in said pivot arm and having a sidewardly extending pin extending into said curved slot of the pivot arm whereby turning the crank shaft will rotate the rotor and will rotate the oscillating drive gear which, in turn, will oscillate the pivot arm and the center shaft, said center shaft moving faster in one direction than in the other direction and having a stroke of oscillation greater than the diameter of a circle subscribed by said pin on the oscillating drive gear.

6. The spinning reel according to claim 5 wherein the center shaft has an I-shaped end with a body on the I which moves slidably within the slot.

7. The spinning reel according to claim 5 wherein the center shaft has a disc-shaped end which resides in the slot, the sidewardly extending pin being mounted on the disc.

8. The spinning reel according to claim 7 wherein a concave surface on the pivot arm defines the curved slot and the concave surface defining the curved slot opens in a forward direction on the reel.

9. In a spinning reel having a housing with a forwardly extending sleeve on the front thereof, a pinion gear assembly extending rotatably through said sleeve and having a longitudinal axis, a rotor secured on an exposed end of said pinion gear assembly, a pinion gear on a portion of said pinion assembly inside said housing, a crank shaft in said housing having an axis perpendicular to a plane containing the longitudinal axis of the pinion gear assembly, a drive gear on said crank shaft meshing with the pinion gear on the pinion gear assembly, a second gear on said crank shaft, an oscillating drive gear rotatably mounted on an axis parallel to the axis of the crankshaft and meshing with the second gear on the crank shaft, a pair of bail arms pivotably mounted on opposite sides of said rotor with a bail extending between said bail arms, a center shaft extending through said pinion assembly and supporting a spool on the forward end thereof and means for oscillating said center shaft, characterized by an oscillating pivot arm pivotably mounted on the housing at a location offset from the center shaft, said pivot arm having a first elongate blind slot on one side thereof;

a pin on the oscillating drive gear engaging in said first elongate slot in said pivot arm;

a second slot formed in the other side of said pivot arm;

a recess between the first and second slots and communicating with the second slot throughout substantially the entire extent of said second slot, the rear end portion of the center shaft extending into said recess in said pivot arm; and pivot means on said center shaft extending into said second slot of the pivot arm whereby turning the crank shaft will rotate the rotor and will rotate the oscillating drive gear which, in turn, will oscillate the pivot arm and the center shaft, said center shaft will move faster in one direction than in the other direction and said center shaft will have a greater length of oscillating stroke than the diameter of a circle subscribed by the pin on the oscillating drive gear.

10. A spinning reel according to claim 9 wherein said second slot is defined by a curved surface on the other side of the pivot arm, said surface defining the second slot having a center of curvature which is forward of the pivot arm.

11. A spinning reel as claimed in claim 10 wherein said second slot overlaps a portion of said first slot.

* * * * *